United States Patent [19]

Eaves

[11] 3,827,797
[45] Aug. 6, 1974

[54] OVERHEAD PROJECTOR APPARATUS

[76] Inventor: Robert B. Eaves, 1395 Varnum Dr., Wayne, Pa. 19087

[22] Filed: Apr. 2, 1973

[21] Appl. No.: 347,392

[52] U.S. Cl................. 353/122, 353/50, 40/106.53
[51] Int. Cl........................ G03b 21/00, G09f 13/34
[58] Field of Search....... 40/106.51, 106.52, 106.53, 40/106.54; 353/46, 50, 122

[56] References Cited
UNITED STATES PATENTS

| | | | |
|---|---|---|---|
| 2,058,581 | 10/1930 | Fegan | 40/106.53 |
| 2,918,743 | 12/1959 | Swarbrick | 40/106.53 |
| 3,235,987 | 2/1966 | Yates | 40/106.51 |
| 3,667,145 | 6/1972 | Wright | 40/106.53 |

*Primary Examiner*—Harry N. Haroian

[57] ABSTRACT

An adapter or attachment mechanism is presented for use in a standard overhead projector whereby displays having the illusion of motion can be projected. The adapter has a transparent display platform which houses a movable dot patterned activator sheet and has a dot patterned art sheet on the platform, with this assembly being positioned over the normal light table or display deck of an overhead projector. Transmission of light through the adapter assembly coincidentally with movement of the activator sheet result in the projection of a display having the illusion of motion.

10 Claims, 3 Drawing Figures

PATENTED AUG 6 1974 3,827,797

OVERHEAD PROJECTOR APPARATUS

BACKGROUND OF THE INVENTION

1. Field of the Invention

This invention relates to the field of projection apparatus employing transparencies for the projection of an image on a display surface. More particularly, this invention relates to an adapter for use with a standard overhead projector whereby the standard overhead projector can be modified to project displays having the illusion of motion rather than merely being the typical still display normally associated with transparency projection.

2. Description of the Prior Art

Projection apparatus of various types for the display of images from transparencies have, of course, been known for many years. However, except for the well known types of various movie machines, slide or other transparency devices have only been capable of projecting stationary images. Techniques have been disclosed in the prior art for producing illusions of motion through use of such techniques as polarization and moire patterning. However, these prior art techniques have, for the most part, required elaborate display devices, or at least display devices which are not commonly found in, or adaptable for use with standard types of projection apparatus in wide use in the home and various institutions.

As is disclosed and claimed in U.S. Pat. No. 3,643,361 and U.S. Pat. applications Ser. Nos. 213,483 and 226,846 the present applicant has invented apparatus and methods for the creation of the illusion of motion by moire patterning. In the instant application, applicant is presenting an adapter for use with standard projection machines whereby motion illusion can be projected with the use of dot patterned transparencies. In particular, the apparatus of the present invention can be easily used with a standard overhead projector of the type now in common use, thus making it possible to project displays having the illusion of motion. Of particular importance is the fact that the present invention is an adapter which can be employed merely by placing it over the light window of a standard overhead projector without requiring any modificaton of the projector itself. Thus, standard overhead projectors can be modified to project motion illusion displays in an inexpensive manner and without any need to modify the basic display device.

Accordingly, one object of the present invention is to provide a novel and improved adapter for use with projection apparatus.

Another object of the present invention is to provide a novel and improved adapter for display apparatus whereby motion illusion displays can be projected.

Still another object of the present invention is to provide a novel and improved adapter for overhead projectors whereby displays having motion illusion can be projected without the need for any substantial modification of the standard projection apparatus.

Still another object of the present invention is to provide a novel and improved adapter whereby overhead projectors can project displays of motion illusion with the use of an adapter which is merely placed on the standard transparent light table of the overhead projector.

Other objects and advantages of the present invention will be apparent to and understood by those skilled in the art by reference to the following detailed description and drawings.

BRIEF DESCRIPTION OF THE DRAWINGS

Referring now to the drawings, wherein like elements are numbered alike in the several figures.

DESCRIPTION OF THE PREFERRED EMBODIMENT

Figure 1:
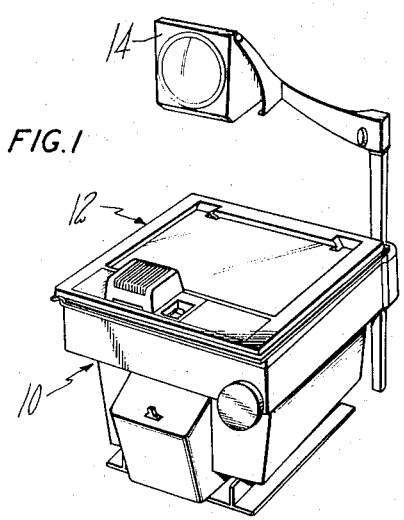
FIG. 1 is a perspective view of an overhead projector with the adapter of the present invention mounted in place.

Referring now to FIG. 1, a standard overhead projector 10 is shown with the adapter 12 of the present invention mounted in place on the upper transparent light table or display plane of the standard overhead projector. The overhead projector itself is a well known device in the prior art, and no description of it will be provided herein other then to note that it projects a display by means of locating a transparency on the horizontal transparent light table, directing light through the transparency to a lens and/or mirror assembly 14 which directs the display beam to a display surface such as a screen or wall. In the present invention the adapter 12 is sized to fit on or over the standard transparent light table of projector 10, and adapter 12 is positioned on the projector for use merely by placing it over the light table of the overhead projector as is clearly shown in FIG. 1.

Figure 2:
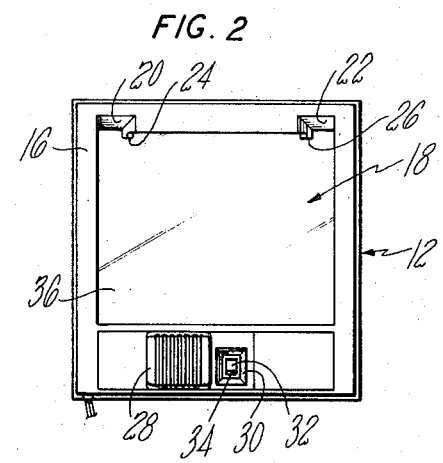
FIG. 2 is a top plan view of the adapter of the present invention.

Referring now to FIG. 2, the external features of the adapter of the present invention are shown. The adapter has a peripheral frame 16, preferably of some form of plastic material which surrounds and defines a light transmitting center section 18. One edge of the frame, which may be referred to as the top edge, has a pair of beveled recesses 20 and 22 in the corners where that top edge meets the sides and inboard of those beveled recesses are a pair of upstanding fingers or posts 24 and 26. In the operation of the adapter a transparency is placed on center portion 18, and the upper edge of the transparency rests on posts 24 and 26 so that the upper edge of the transparency is slightly elevated above center section 18. Recess 20 and 22 serve as access ways in which the operator of the projector places his fingers to get under the edge of the transparency to easily remove it from the adapter without having to contact and possibly mar any part of the transparency on which the display may be located. The lower thickened edge of the frame contains a louvered motor casing and a beveled recess 30 having a central opening in which a manual switch 34 reciprocates, all of which elements will be described in more detail with reference to FIG. 3.

Figure 3:
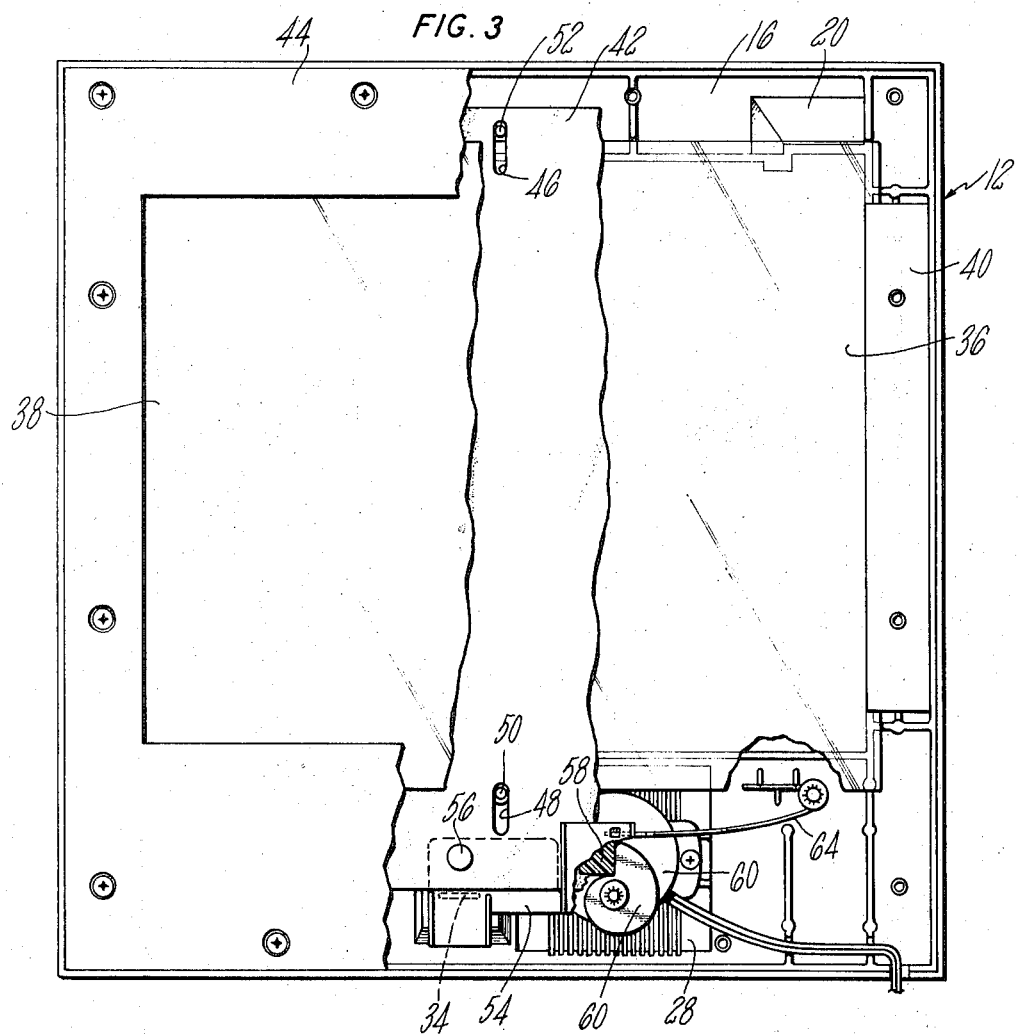
FIG. 3 is an enlarged view of the adapter of FIG. 2 partially broken away to show interior details.

Referring now to FIG. 3, the adapter of the present invention is shown from its rear side, i.e., the view which would be seen from the rear of the paper in viewing FIG. 2, with parts broken away to show details of the interior of the adapter. Light transmitting center section 18 is composed of an upper and lower transparent sheets 36 and 38, respectively, of glass or other transparent material. Glass plates 36 and 38 are held in spaced apart relationship by spacers 40 at each side of the frame, and a transparent dot patterned sheet 42 is located between glass plates 36 and 38. The assembly is held together by a back frame member 44 which is held in place by screws or other suitable fastening elements.

Dot patterned sheet 42 is a transparent sheet with a uniform pattern of dots printed thereon. Motion illusion is created with the present invention by application of techniques and all the teachings of U.S. Pat. No. 3,643,361 and U.S. Pat. applications Ser. Nos. 213,483 and 226,846, which patent and patent applications teach the creation of the illusion of motion by the use of relatively movable dot patterned sheets, one of which is of uniform dot pattern, i.e., the activator sheet, and the other of which is of differing dot patterns and has art work or information or displays or various kinds thereon, i.e., the art sheet. All of the disclosures of said referenced patent and patent applications are incorporated herein by reference and made a part hereof with regard to the teachings of the nature and construction and interrelationship of the activator sheet and the art sheet. Uniform dot patterned sheet 42 of the present invention corresponds to the activator sheet as described in said referenced patent and patent applications, and the transparency which would be placed on the upper surface of the adapter, as briefly discussed with respect to FIG. 2, corresponds to the art sheet having sections of differing dot patterns.

Still referring to FIG. 3, activator sheet 42 is movably mounted between glass plates 36 and 38 so that it can move up and down between the top edge and the bottom edge of the adapter frame. Sheet 42 is generally rectangular, and a pair of elongated slots 46 and 48 are present in activator sheet 42 near the top and bottom along the approximate center longitudinal axis of the sheet, and guide pins 50 and 52, attached to the frame, extend into slots 46 and 48 to guide the movement of activator sheet 42 and assure its continued relative movement in a straight up and down oscillatory path without skewing or binding.

As is taught in the patent and applications referred to above and incorporated herein, motion illusion is created by relative motion of activator sheet 42 with respect to the art sheet while passing light through the sheets and directing the light to a display surface. In the present invention the desired oscillatory movement of activator sheet 42 can be accomplished either manually or automatically. To those ends, a transmission member or link 54, preferably of plastic, is attached to sheet 42 by means of a first peg 56 which extends from link 54 and passes through the front of sheet 42 and a second peg 58 which extends from link 54 through sheet 42 from the backside. Manual switch 34 is attached to transmission link 54 in direct vertical alignment with peg 56 so that sheet 42 can be manually moved by manual oscillation of switch 34; peg 58 is a cam follower in direct alignment with and in contact with the surface of a cam 60 which is operated by a motor 62 whereby an automatic periodic oscillatory movement can be imparted to activator sheet 42. As can clearly be seen from the shape of cam 60, a clockwise rotation of the cam (clockwise as seen from the bottom view of FIG. 3) will cause the cam follower to move slowly upwardly till the vertical drop of the cam surface is encountered, and the cam follower will then drop quickly down to the lower surface of the cam to repeat the cycle, thus resulting in the desired motion of activator sheet 42. A leaf spring 64 is attached at one end to the frame, and the other end extends into an opening in transmission link 54 to urge cam follower 58 against the contoured surface of the cam, thus assuring adherence to the surface of the cam and the generation of a programmed upward motion and quick return of the cam follower and sheet 42 in accordance with the surface of the cam. The direct alignment between manual switch 34 and peg 56 on the one hand and cam 60 and follower 58 on the other, coupled with the engagement between pins 50 and 52 and slots 46 and 48 assures a steady even movement of activator sheet 42 without skewing or jamming thereof.

Referring now to a combined consideration of FIGS. 1, 2 and 3, the adapter of the present invention is placed on the light table surface of the standard overhead projector and is then ready for operation. The desired transparency, which is an art sheet including areas of different dot patterns in accordance with the teaching of the referenced patent and patent applications, is then placed on the upper surface of glass plate 36 with the upper edge of the art sheet resting on posts 24 and 26. Light from the overhead projector is then passed through the transparency and directed to the desired display surface via mirror assembly 14 to display the subject matter of the transparency. Upon movement of the activator sheet 42 with respect to the art sheet, either manually by switch 34 or automatically by operation of motor 62, various parts of the image being displayed will appear to be in motion in accordance with the relationships between the dot patterns on the art sheet and the dot pattern on the activator sheet in accordance with the teachings of the referenced patent and patent applications.

It can thus be seen that use of the adapter of the present invention results in and makes possible the projection of displays having the illusion of motion by merely placing the adapter on a standard overhead projector and using the proper art sheets. The motion illusion can be of a constant repetitive nature through the opertion of the motor and cam; or, if desired for purposes such as emphasis in teaching, manual operation of switch 34 can be employed to direct particular attention of the viewer to certain desired motion illusion features. Furthermore, it will be noted that the significant advantages of the present invention are accomplished without any need to modify the basic configuration of the standard overhead projector, and it will be further noted that the overhead projector can be restored to its normal configuration merely by removing the adapter of the present invention from the upper surface of the overhead projector.

While a preferred embodiment has been shown and described it is to be noted that various modifications and substitutions may be made thereto without departing from the spirit and scope of the invention. Accordingly, the present invention has been described by way of illustration and not limitation.

What is claimed is:

1. An adapter for mounting on a light table of projection apparatus, the adapter including:
   a frame;
   a pair of transparent plates housed in said frame, one of said plates being intended to receive a transparency having an image to be projected;
   spacer means holding said plates in spaced apart relationship;

an activator sheet between said plates, said activator sheet having a pattern thereon;

operating means for moving said activator sheet in a desired path; and access means at one edge of said frame above said one plate to permit access to the side of a transparency facing said one plate.

2. An adapter as in claim 1 wherein:
said operating means includes manually operative means attached to said activator sheet.

3. An adapter as in claim 2 wherein:
said manually operative means is a switch housed in a recess in said frame.

4. An adapter as in claim 2 including:
motion transmitting means connected to said activator sheet, said manually operative means being connected to said motion transmitting means.

5. An adapter as in claim 1 wherein:
said operating means includes motor means on said frame for automatically moving said activator sheet.

6. An adapter as in claim 5 including:
cam means operated by said motor; and
cam follower means connected to said activator sheet.

7. An adapter as in claim 6 including:
spring means urging said follower into contact with said cam.

8. An adapter as in claim 7 including:
motion transmitting means connected to said activator sheet, said cam follower being connected to said motion transmitting means.

9. An adapter as in claim 1 including:
guide means for guiding the movement of said activator sheet.

10. An adapter as in claim 9 wherein:
said guide means includes pins projecting from said frame into slots in said activator sheet.

* * * * *